United States Patent [19]
Tajima et al.

[11] Patent Number: 5,517,614
[45] Date of Patent: May 14, 1996

[54] DATA COMPRESSION/ENCRYPTION PROCESSING APPARATUS

[75] Inventors: Masato Tajima, Yokohama; Taro Shibagaki, Tokyo, both of Japan

[73] Assignee: Kabushiki Kaisha Toshiba, Kawasaki, Japan

[21] Appl. No.: 69,105

[22] Filed: May 28, 1993

[30] Foreign Application Priority Data

May 29, 1992 [JP] Japan .................................. 4-139424
May 29, 1992 [JP] Japan .................................. 4-139425

[51] Int. Cl.$^6$ ............................................ G06F 11/00
[52] U.S. Cl. ................ 395/180; 364/260.6; 364/260.81; 364/265; 364/DIG. 1
[58] Field of Search ....................... 395/575, 650, 395/700; 380/20, 28, 37, 42

[56] References Cited

U.S. PATENT DOCUMENTS

| | | | |
|---|---|---|---|
| 4,172,213 | 10/1979 | Barnes et al. ............................. | 178/22 |
| 4,803,725 | 2/1989 | Horne et al. . | |
| 4,809,327 | 2/1989 | Shima . | |
| 4,964,164 | 10/1990 | Fiat ........................................... | 380/30 |
| 5,003,597 | 3/1991 | Merkle ....................................... | 380/37 |
| 5,020,106 | 5/1991 | Rabold et al. ............................. | 380/49 |
| 5,222,139 | 6/1993 | Takaragi et al. .......................... | 380/28 |
| 5,325,433 | 6/1994 | Torii et al. ................................. | 380/30 |

*Primary Examiner*—Kevin A. Kriess
*Assistant Examiner*—John Q. Chavis
*Attorney, Agent, or Firm*—Oblon, Spivak, McClelland, Maier & Neustadt

[57] ABSTRACT

A block processing section divides message data into a plurality of blocks, so as to obtain a plurality of data blocks. A plurality of data encryption processing sections are provided in correspondence to the data blocks. The first one of the data encryption processing sections selects one of prestored data conversion algorithms in response to an initial selection control signal. Each of the remaining data encryption processing sections selects one of the data conversion algorithms in response to a selection control signal supplied from a preceding data encryption processing section. Each of the data encryption processing sections performs data encryption processing with respect to the corresponding data block on the basis of the selected data conversion algorithm, and generates a selection control signal to be supplied to the succeeding data encryption processing section, on the basis of the data obtained by the data encryption processing.

12 Claims, 4 Drawing Sheets

DATA COMPRESSION/ENCRYPTION PROCESSING APPARATUS

BACKGROUND OF THE INVENTION

1. Field of the Invention

The present invention relates to a data processing apparatus for compressing/encrypting message data by use of a plurality of function algorithms. The present invention also relates to a modularization technique for the data processing apparatus.

2. Description of the Related Art

In recent years, a data compression type encryption processing function (a hash function), which is applicable to the compression/encryption processing of message data, has attracted the attention of those skilled in the art. To put this function into practice, a method that utilizes, for example, the CBC (cipher block chaining) mode of the DES (data encryption standard) has been proposed.

According to this method, message data subjected to data hashing is divided into data blocks of appropriate size (e.g., L bits) as follows:

$\{B_i\}$ (i=1 to m)

The encryption processing for the (k+1)th data block (k=0 to m−1) is defined as follows:

$C_{k+1} = FK(C_k + B_{k+1})$

It is assumed that FK represents a block encryption processing function using an encryption key K (fixed). It is also assumed that where k=0, an initial vector $I_0$ is given to $C_0$. In this case, the hash value is defined by the processing result $C_m$ obtained in the final stage of the processing.

However, the data compression/encryption processing system utilizing the CBC mode has problems in that once the encryption key K is decoded, two different message data items having the same hash value may be easily produced.

Let it be assumed that the data blocks of the two different message data items M and M' are expressed by:

$M = \{B_i\}$ $M' = \{B_i'\}$ where i=1 to m. If, in this case, the condition expressed by $C_{m-1} + B_m = C_{m-1}' + B_m'$ is satisfied, the hash values of M and M' become equal to each other though the message data items have been processed in different ways.

In other words, "$C_{m-1} + B_m$" can be presumed based on hash value $C_m$ if the encryption key K is decoded. Hence, M', which has the same hash value as M, can be obtained by performing calculation, with a block group $\{B_i'\}$ (i=1 to m−1) appropriately determined, and by determining the final block $B_m'$ to satisfy the condition formula. This means that data collision may easily occur in the encryption processing method which is based on the hash function utilizing the CBC mode.

An encryption LSI (large scale integration circuit) is known as a function processing module which is used to execute the function processing (e.g., encryption processing) of data, for the data security purpose. In the prior art, the function processing module of this type supports only one function algorithm. Even if it supports a plurality of function algorithms, one of them is selected for use, in response to an external switching control signal. Therefore, when a data processing apparatus of this type is fabricated as a module, it is necessary to ensure very reliable data security.

SUMMARY OF THE INVENTION

As has been described, the use of the hash function utilizing, for example, the conventional CBC mode results in an increase in the possibility of the occurrence of data collision. Therefore, a data processing apparatus adopting the hash function has to be so designed as to avoid the data collision, for ensuring data security. Where the data processing apparatus of this type is fabricated as a module, consideration has to be given to ensure more reliable data security.

The present invention has to be developed to solve the problems mentioned above, and the first object of the present invention is to provide a data processing apparatus which prevents data collision from occurring when data is subjected to compression/encryption processing, and which ensures reliable data security. The second object of the present invention is to provide a modularization technique which ensures the secrecy of data when the data processing apparatus of this type is fabricated as a module.

According to the present invention, there is provided a data processing apparatus comprising:

a block processing section (11) for dividing message data (B) into a plurality of blocks, so as to obtain a plurality of data blocks ($B_i$ (i=1 to m)); and a plurality of data conversion processing sections ($12_i$) which are provided in correspondence to the data blocks ($B_i$) and each of which stores a plurality of data conversion algorithms therein, a first one of the data conversion processing sections selecting one ($A_{i-1}$) of the data conversion algorithms in response to an initial selection control signal ($S_0$) and each of remaining ones of the data conversion processing sections selecting one ($A_{i-1}$) of the data conversion algorithms in response to a selection control signal ($S_{i-1}$) supplied from a preceding data conversion processing section ($B_{i-1}$), each of the data conversion processing sections ($12_i$) performing data conversion processing with respect to the corresponding data block ($B_i$) on the basis of the selected data conversion algorithm and generating a selection control signal used for processing a next data block ($B_{i+1}$) on the basis of the data conversion processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The first embodiment of the present invention will now be described with reference to the accompanying drawings. The embodiment will be described, referring to the case where message data is subjected to compression/encryption processing by use of a hash function utilizing an improved and generalized CBC mode.

Figure 1:
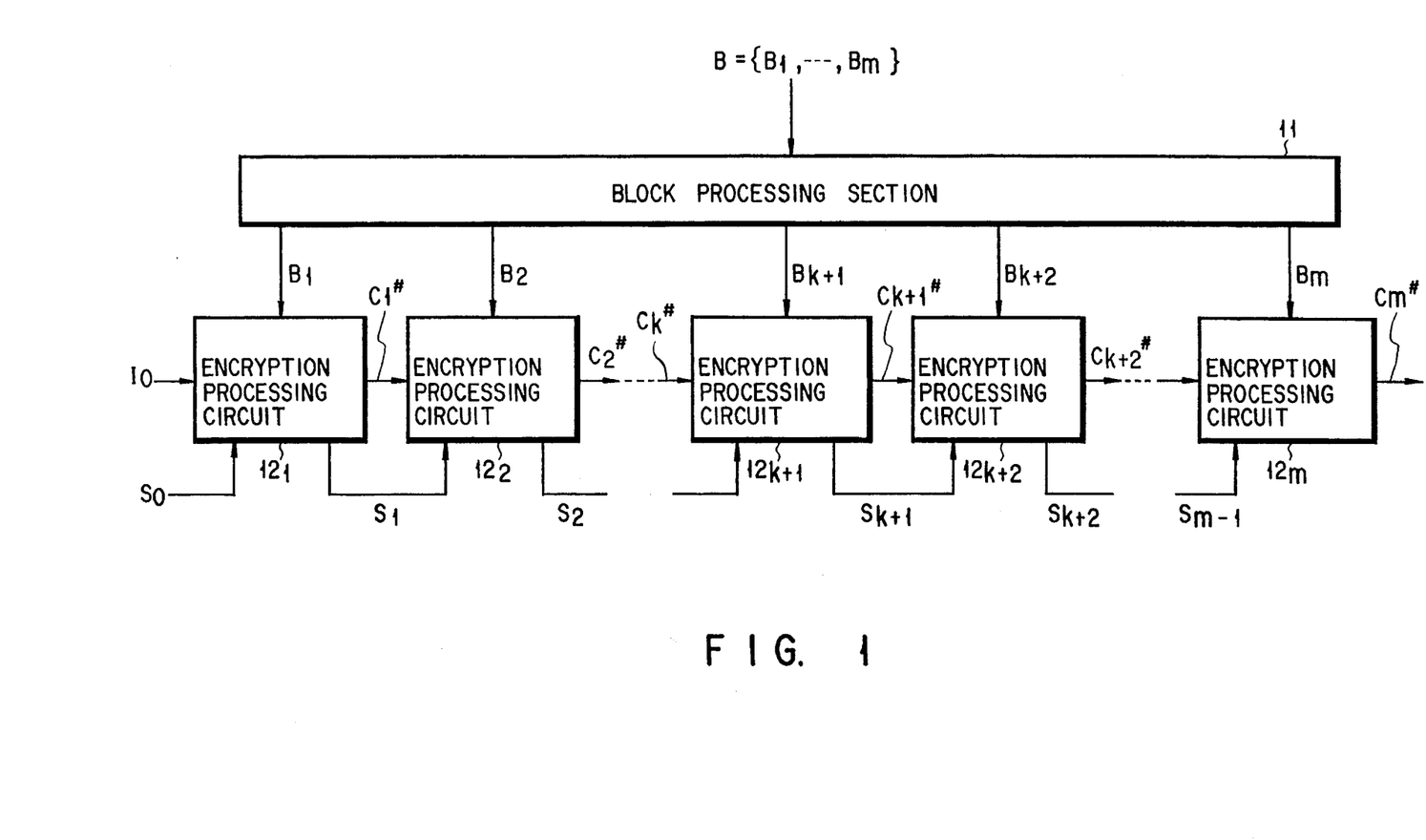
FIG. 1 is a block circuit diagram showing a data processing apparatus according to the first embodiment of the present invention.

FIG. 1 shows the data processing apparatus employed in the embodiment. Referring to FIG. 1, a block processing section 11 divides input message data B into a plurality of blocks, and the resultant data blocks $B_i$ (i=1, 2 ..., k+1, k+2 ..., m) are output in parallel at appropriate time intervals. Each data block $B_i$ is supplied to the corresponding one of encryption processing circuits $12_i$.

The encryption processing circuits $12_i$ are of the same configuration, and an initial parameter $I_0$ (which can be used as a key) is determined for the first one $12_1$ of encryption processing circuits $12_i$. Each of the remaining encryption processing circuits $12_i$ receives data block $B_i$, and encrypts it on the basis of the processing result $C_{i-1}\#$ (when i=1, $C_0\#=I_0$) of the preceding processing circuit. The result of processing of the final processing circuit $12_m$ is the compressed and encrypted data of message data B.

Figure 2:
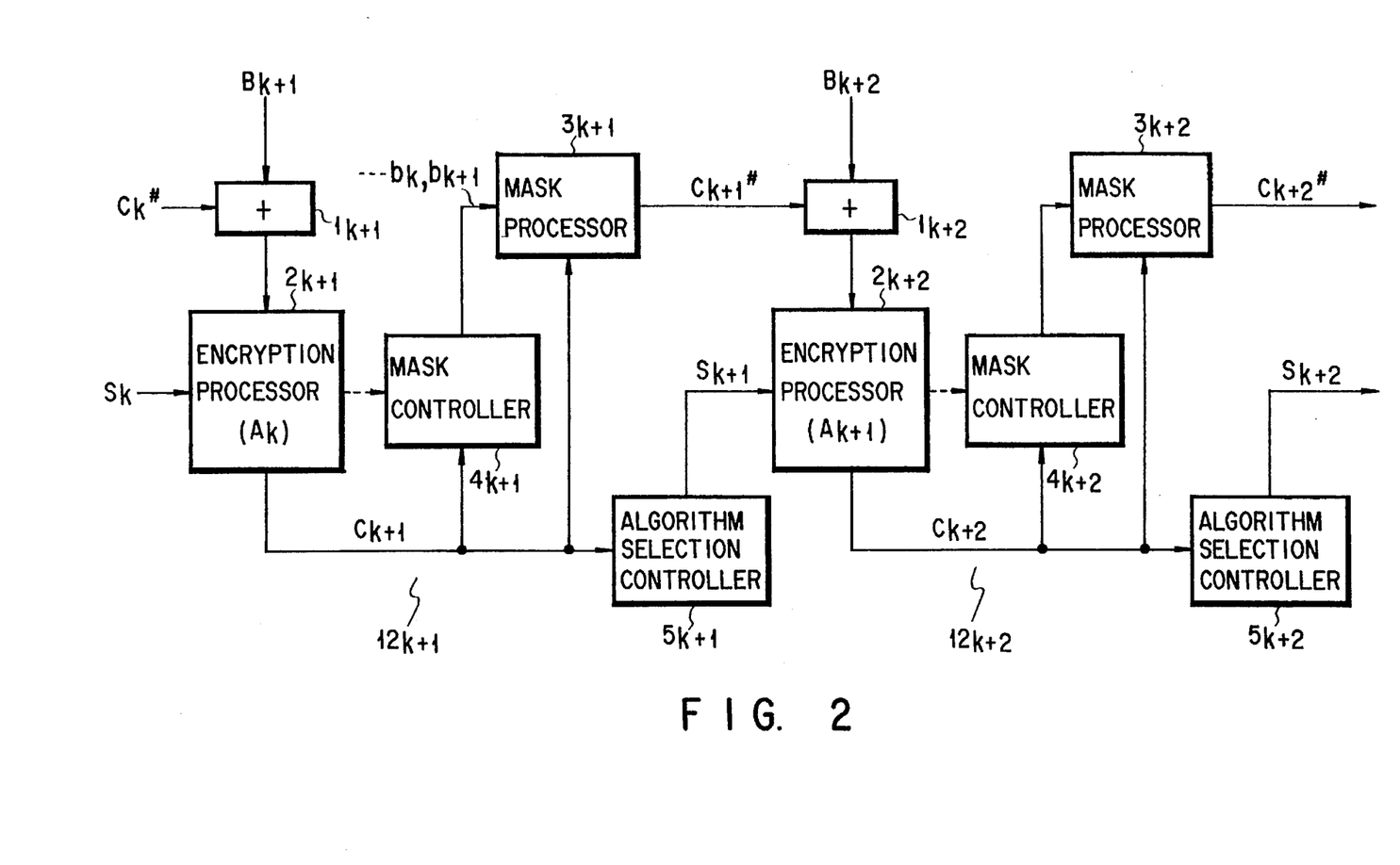
FIG. 2 is a block circuit diagram showing the configuration of a compression/encryption circuit employed in the first embodiment.

FIG. 2 shows the circuit configurations of the (k+1)th and (k+2)th ones of the encryption processing circuits $12_i$ mentioned above. Referring to FIG. 2, the (k+1)th data block is supplied to an adder $1_{k+1}$. By this adder, the kth processing result $C_k\#$ (when k=0, $C_0\#=I_0$) is added to the data block $B_{k+1}$. The result of this addition is supplied to an encryption processor $2_{k+1}$. The encryption processor $2_{k+1}$ selects one of pre-stored N encryption function algorithms (hereinafter referred to as "encryption algorithms" or simply as "algorithms") $A_0$ to $A_{N-1}$, in response to a selection signal $S_k$ supplied from a kth algorithm selection controller, and encrypts the addition result of the adder $1_{k+1}$ by use of the selected algorithm.

The processing result $C_{k+1}$ of the encryption processor $2_{k+1}$ is supplied to both a mask processor $3_{k+1}$ and a mask controller $4_{k+1}$.

Upon reception of the processing result $C_{k+1}$, the mask controller $4_{k+1}$ identifies the history of the encryption algorithm executed by the encryption processor $2_{k+1}$ and stores the data obtained by the identification. Then, the mask controller $4_{k+1}$ determines a control value ( ..., $b_k$, $b_{k+1}$) dependent on the entirety or part of the encryption algorithm, and supplies the determined control value to the mask processor $3_{k+1}$.

Since the history of the encryption algorithm executed by the encryption processor $2_{k+1}$ can be stored as data in the encryption processor $2_{k+1}$, the mask controller $4_{k+1}$ may be supplied with the history data directly from the encryption processor $2_{k+1}$.

The mask processor $3_{k+1}$ performs mask processing with respect to the processing result $C_{k+1}$ of the encryption processor $2_{k+1}$, such that the processing result $C_{k+1}$ cannot be read or presumed afterwards. To be more specific, the entirety or part of the processing result $C_{k+1}$ is replaced with other values on the basis of the control value ( ..., $b_k$, $b_{k+1}$) supplied from the mask controller $4_{k+1}$. The result $C_{k+1}\#$ of the mask processing is supplied to the (k+2)th adder $1_{k+2}$.

The processing result $C_{k+1}$ of the encryption processor $2_{k+1}$ is also supplied to an algorithm selection controller $5_{k+1}$. By this controller $5_{k+1}$, an encryption algorithm to be executed by a (k+2)th encryption processor $2_{k+2}$ is determined, using a statistical method which is dependent on both the encryption algorithm $A_k$ executed by the encryption processor $2_{k+1}$ and the values of the entirety or part of the processing result $C_{k+1}$ obtained by the execution of the encryption algorithm $A_k$. A selection signal $S_{k+1}$ representing the determined encryption algorithm is supplied to the (k+2)th encryption processor $2_{k+2}$.

Just like the (k+1)th encryption processing circuit, the (k+2)th encryption processing circuit for performing encryption of data block $B_{k+2}$ is made up of an adder $1_{k+2}$, an encryption processor $2_{k+2}$, a mask processor $3_{k+2}$, a mask controller $4_{k+2}$, and an algorithm selection controller $5_{k+2}$. The operations of these structural components are similar to those of the structural components of the (k+1)th encryption processing circuit.

The configuration and operation of each of the other encryption processing circuits (namely, the first through ith processing circuits and (k+3)th through m-th processing circuits) are similar to those mentioned above. Therefore, the configurations of the other encryption processing circuits are not shown in the drawings, and reference to the operations of them will be omitted herein. It should be noted that since each encryption processing circuit processes the data output from its preceding encryption processing circuit, the block processing section 11 has to supply data blocks $B_i$ to the respective encryption processing circuits with appropriate time delays.

The reasons why data collision can be prevented in the above-mentioned data processing apparatus will now be explained.

The compression/encryption procedures of message data are defined by the following formulas:

$$C_{k+1} = A_k(C_k\# + B_{k+1}) \tag{1}$$

$$A_{k+1} = g(A_k, [C_{k+1}]_n) \tag{2}$$

$$C_{k+1}\# = C_{k+1} + [b_{k-r+2} \ldots b_k \, b_{k+1}] \tag{3}$$

where $0 \leq k \leq (m-1)$.

Assuming that $1 \leq i \leq (n+\alpha)$ and $r(n+\alpha)=L$, the following formulas are obtained:

$$[b_{k-r+2} \ldots b_k \, b_{k+1}] = [b_{k-r+2}^{(i)} \ldots b_k^{(i)} \, b_{k+1}^{(i)}] \tag{4}$$

$$b_{k+1}^{(i)} = \beta(\xi_{k+1} : A_k \rightarrow A_{k+1}) \tag{5}$$

When k=0 in these formulas, $A_0$ denotes an arbitrarily-designated initial algorithm, and $C_0\#$ denotes an appropriate initial vector (initial parameter) $I_0$.

What is meant by each of the above formulas (1)–(5) will be explained.

Where $A_k$ denotes the encryption algorithm executed by the (k+1)th encryption processing circuit, encrypted data $C_{k+1}$ is derived from the processing result $C_k\#$ of the kth encryption processing circuit and the present data block $B_{k+1}$ by use of the encryption algorithm $A_k$. (formula (1))

Then, an encryption algorithm $A_{k+1}$ to be executed in the next encryption processing circuit (i.e., the (k+2)th processing circuit) is determined based on both n bits $[C_{k+1}]_n$ included in the encrypted data $C_{k+1}$ (e.g., lower n bits of the encrypted data) and the encryption algorithm $A_k$ presently executed. (formula (2))

The encryption algorithm $A_{k+1}$ to be executed in the next encryption processing circuit can be determined in various methods. One of the methods is a method wherein the n bits of the encrypted data $C_{k+1}$ and the present encryption algorithm $A_k$ are used such that the temporal changes in the encryption algorithm form a finite-state discrete-time Markovian process.

To realize this method, the use of a trellis diagram of the convolutional codes of an encoding rate of $n/(n+\alpha)$ is effective. The trellis diagram is one of the representations of convolutional codes and is a kind of state transition diagram. The trellis diagram is featured in that all states are shown in relation to time.

Figure 3:
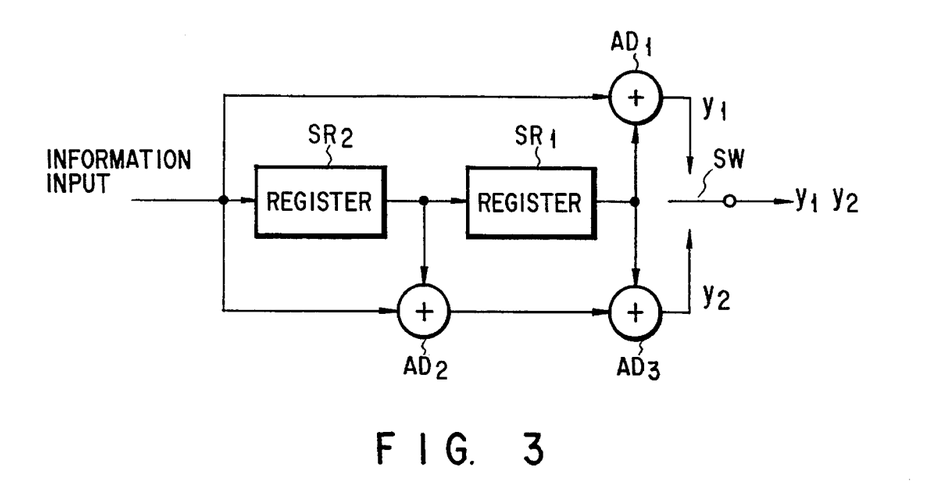
FIG. 3 is a block circuit diagram showing the configuration of a convolutional encoder which realizes the encryption algorithm determination method used in the first embodiment.
Figure 4:
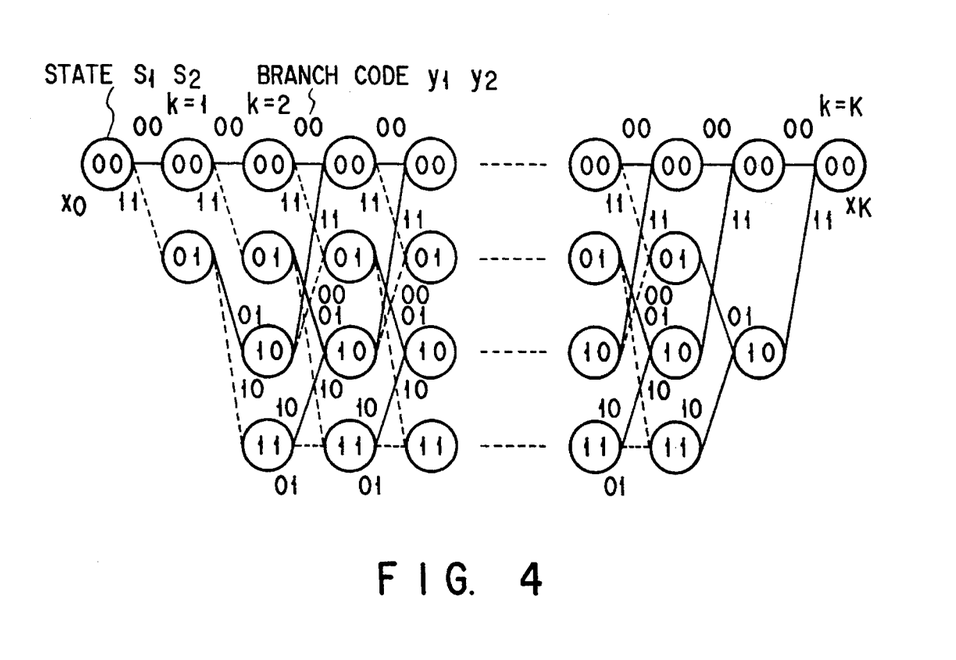
FIG. 4 is a trellis diagram corresponding to the operation of the convolutional encoder shown in FIG. 3.

FIG. 3 is a block circuit diagram showing the configuration of a general convolutional encoder, and FIG. 4 is a trellis diagram corresponding to the operation of the convolutional encoder. In the convolutional encoder shown in FIGS. 3 and 4, an encoded output of 2 bits is produced in response to an information input of 1 bit, so that the encoding rate is ½.

Referring to FIG. 3, a 1-bit information input is sequentially shifted by 1-bit shift registers $SR_1$ and $SR_2$. The 1-bit information input is added to the output of shift register $SR_1$ by an adder $AD_1$, to thereby obtain a signal $y_1$. Also, the 1-bit information input is added to the output of shift register $SR_2$ by an adder $AD_2$, and the resultant signal is added to the output of register $SR_1$ by an adder $AD_3$, to thereby obtain a signal $y_2$. Signals $y_1$ and $y_2$ are alternately output by means of a switch SW.

In FIG. 4, the states of registers $SR_1$ and $SR_2$ are shown in the vertical direction, and time k is shown in the horizontal direction. When information bit "1" is input in the state where k=0 and the contents of registers $SR_1$ and $SR_2$ are (00), the contents of registers $SR_1$ and $SR_2$ become (01) when k=1. This state transition is indicated by the broken lines.

In FIG. 4, an encoder output (11) is assigned to line segments corresponding to the state transitions. The line segments are generally referred to as "branches", and the encoder output (11) is often referred to as "branch codes".

When information bit "0" is input, the contents of registers $SR_1$ and $SR_2$ become (00). This state transition is indicated by the solid lines. The related encoder outputs <00> are assigned to the corresponding transition branches.

In the trellis diagram representation, a series of branches are referred to as a "path", and each of the paths extending from the left side to the right side of the trellis diagram corresponds to a code.

The convolutional codes mentioned above and the trellis diagram thereof are described in detail in A. J. Viterbi, *Convolutional Codes and Their Performance in Communication Systems*, IEEE Trans. Commun. Technol, vol. COM-19, No. 5, pp. 751–772, 1971.

When state $A_k$ in the trellis diagram subsequently changes to new state $A_{k+1}$ in response to input of n bits (information bits), a new branch code represented by $$b_{k+1}^{(i)} \ (1 \leq i \leq n+\alpha)$$

is produced. (formula (5)) By use of the past history of the branch codes including this new branch code (formula (4)), the entirety (or part) of the values of the history is replaced with other values dependent on the entirety (or part) of the history of the algorithms, thereby concealing the value of $C_{k+1}$. The result obtained thereby is expressed as $C_{k+1}\#$ (formula (3)).

A description will be given of the conditions under which data collision occurs. In view of the definitions, it is understood that data collision occurs when the hash values $C_m\#$ and $(C_m')\#$ of two different message data items M and M' coincide with each other. In the following, therefore, a description will be given of the condition under which the hash values coincide with each other.

The hash values $C_m\#$ and $(C_m')\#$ of the different message data items M and M' are represented by:

$$C_m\# = C_m + [b_{m-r+1} \ b_{m-r+2} \ \ldots \ b_m]$$

$$(C_m')\# = C_m' + [b_{m-r+1}' \ b_{m-r+2}' \ \ldots \ b_m']$$

Hence, the two hash values become equal to each other when the following two conditions are satisfied:

$$C_m = C_m'$$

$$[b_{m-r+1} \ b_{m-r+2} \ \ldots \ b_m] = [b_{m-r+1}' \ b_{m-r+2}' \ \ldots \ b_m']$$

With the latter relationships in mind, the following conditions are initially determined:

$$A_{m-r} = A_{m-r}'$$

$$C_{m-r}\# + B_{m-r+1} = (C_{m-r}')\# + B_{m-r+1}' \quad (6)$$

In this case, the following formula is obtained because of the assumption:

$$\begin{aligned} C_{m-r+1} &= A_{m-r}(C_{m-r}\# + B_{m-r+1}) \\ &= A_{m-r}'\{(C_{m-r}')\# + B_{m-r+1}'\} \\ &= C_{m-r+1}' \end{aligned}$$

Hence, the following formula is satisfied:

$$[C_{m-r+1}]_n = [C_{m-r+1}']_n$$

Accordingly, the following two formulas are derived:

$$A_{m-r+1} = A_{m-r+1}'$$

$$b_{m-r+1} = b_{m-r+1}'$$

Next, let it be assumed that the condition represented below is satisfied:

$$C_{m-r+1}\# + B_{m-r+2} = (C_{m-r+1}')\# + B_{m-r+2}' \quad (7)$$

In this case, the following formula is obtained:

$$C_{m-r+2} = A_{m-r+1}(C_{m-r+1}\# + B_{m-r+2})$$
$$= A_{m-r+1}'\{(C_{m-r+1}')\# + B_{m-r+2}'\}$$
$$= C_{m-r+2}'$$

Hence, the following formula is satisfied:

$$[C_{m-r+2}]_n = [C_{m-r+2}']_n$$

Accordingly, the following two formulas are derived:

$$A_{m-r+2} = A_{m-r+2}'$$

$$B_{m-r+2} = b_{m-r+2}'$$

After similar procedures are repeated, the condition represented below is assumed:

$$C_{m-1}\# + B_m = (C_{m-1}')\# + B_m' \quad (8)$$

In this case, the following formula is obtained:

$$C_m = A_{m-1}(C_{m-1}\# + B_m)$$
$$= A_{m-1}'\{(C_{m-1}')\# + B_m'\}$$
$$= C_m'$$

Hence, the following formula is satisfied:

$$[C_m]_n = [C_m']_n$$

Accordingly, the following two formulas are derived:

$$A_m = A_m'$$

$$b_m = b_m'$$

At the time, the condition represented by the following formula is confirmed:

$$[b_{m-r+1}\ b_{m-r+2}\ \ldots\ b_m] = [b_{m-r+1}'\ b_{m-r+2}'\ \ldots\ b_m']$$

Hence, the following formulas are satisfied:

$$C_m\# = C_m + [b_{m-r+1}\ b_{m-r+2}\ \ldots\ b_m]$$

$$(C_m')\# = C_m' + [b_{m-r+1}'\ b_{m-r+2}'\ \ldots\ b_m']$$

From these formulas, the following is obtained:

$$C_m\# = (C_m')\#$$

In view of the above, it is understood that the conditions under which data collision occurs are represented by the following four conditions:

$$A_{m-r} = A_{m-r}' \quad (11)$$

$$C_{m-r}\# + B_{m-r+1} = (C_{m-r}')\# + B_{m-r+1}' \quad (12)$$

$$C_{m-r+1}\# + B_{m-r+2} = (C_{m-r+1}')\# + B_{m-r+2}' \quad (13)$$

$$\ldots$$

$$C_{m-1}\# + B_m = (C_{m-1}')\# + B_m' \quad (1r)$$

The condition for satisfying formula (11) will be considered. Since an algorithm changes in accordance with the trellis structure of a limited length ($v_0=nv$), the condition for satisfying formula (11) is the time when the following three formulas (21)–(2v) are satisfied simultaneously:

$$[C_{m-r-v+1}]_n = [C_{m-r-v+1}']_n \quad (21)$$

$$[C_{m-r-v+2}]_n = [C_{m-r-v+2}']_n \quad (22)$$

$$\ldots$$

$$[C_{m-r}]_n = [C_{m-r}']_n \quad (2v)$$

Sprcifically:

$$[A_{m-r-v}(C_{m-r-v}\# + B_{m-r-v+1})]_n = \quad (31)$$
$$[A_{m-r-v}'\{(C_{m-r-v}')\# + B_{m-r-v+1}'\}]_n$$

$$[A_{m-r-v+1}(C_{m-r-v+1}\# + B_{m-r-v+2})]_n = \quad (32)$$
$$[A_{m-r-v+1}'\{(C_{m-r-v+1}')\# + B_{m-r-v+2}'\}]_n$$

$$[A_{m-r-1}(C_{m-r-1}\# + B_{m-r})]_n = \quad (3v)$$
$$[A_{m-r-1}'\{(C_{m-r-1}')\# + B_{m-r}'\}]_n$$

Assuming that the values up to the values of $A_{m-r-v}'$ and $(C_{m-r-v}')\#$ are known values, a description will be given as to how the values of $B_{m-r-v+1}'$ to $B_{m-r}'$ that are factors of M' are determined.

First, the value of $B_{m-r-v+1}'$ is determined in such a manner as to satisfy formula (31). (It should be noted that the value of $B_{m-r-v+1}'$ cannot be determined without reference to the other values.) When the value of $B_{m-r-v+1}'$ is determined, values are determined in the order of $C_{m-r-v+1}' \to A_{m-r-v+1}' \to (C_{m-r-v+1}')\#$, in accordance with the following formula:

$$C_{m-r-v+1}' = A_{m-r-v}'\{(C_{m-r-v}')\# + B_{m-r-v+1}'\}$$

$$A_{m-r-v+1}' = g(A_{m-r-v}', [C_{m-r-v+1}']_n)$$

$$(C_{m-r-v+1}')\# = C_{m-r-v+1}' + [\ldots\ b_{m-r-v+1}']$$

The portion "..." included in the $[\ldots\ b_{m-r-v+1}']$ is specifically $[\ldots\ b_{m-r-v+1}'\ b_{m-r-v}']$ and is a value determined dependent on the past history of the algorithm "... $\to A_{m-r-v-1} \to A_{m-r-v}$". Since the value represented by $$(C_{m-r-v}')\# = C_{m-r-v}' + [\ldots\ b_{m-r-v-1}'\ b_{m-r-v}']$$

is a known value because of assumption, the value of the portion "..." included in the $[\ldots\ b_{m-r-v+1}']$ can be regarded as being determinate. Therefore, if it is assumed that the values up to the value of $(C_{m-r-v}')\#$ are known, the value of $(C_{m-r-v+1}')\#$ can be regarded as being determined based only on $B_{m-r-v+1}'$. After similar procedures are repeated, the value of $B_{m-r}'$ is determined in such a manner as to satisfy formula (3v). As a result, values are determined in the order of $C_{m-r}' \to A_{m-r}' \to (Cm-r')\#$.

It should be noted that the value of $(C_{m-r}')\#$ is dependent on the value of $B_{m-r-v+1}'$ determined at the beginning.

When the values up to the value of $(C_{m-r}')\#$ have been determined, consideration can be made in relation to formulas (11) to (1r) indicated above. That is, if it is assumed that the values up to the values of $A_{m-r-v}'$ and $(C_{m-r-v}')\#$ are known, the formulas below are satisfied and data collision occurs:

$$[A_{m-r-v}(C_{m-r-v}\# + B_{m-r-v+1})]_n = \quad (41)$$
$$[A_{m-r-v}'\{(C_{m-r-v}')\# + B_{m-r-v+1}'\}]_n$$

$$[A_{m-r-v+1}(C_{m-r-v+1}\# + B_{m-r-v+2})]_n = \quad (42)$$
$$[A_{m-r-v+1}'\{(C_{m-r-v+1}')\# + B_{m-r-v+2}'\}]_n$$

$$[A_{m-r-1}(C_{m-r-1}\# + B_{m-r})]_n = \quad (4v)$$

-continued $$[A_{m-r-1} \cdot \{(C_{m-r-1})^{\#} + B_{m-r}\}]_n$$

$$C_{m-r}^{\#} + B_{m-r+1} = (C_{m-r}')^{\#} + B_{m-r+1}' \quad (51)$$

$$C_{m-r+1}^{\#} + B_{m-r+2} = (C_{m-r+1}')^{\#} + B_{m-r+2}' \quad (52)$$

$$C_{m-1}^{\#} + B_m = (C_{m-1}')^{\#} + B_m' \quad (5r)$$

The satisfaction of these formulas is one of the sufficient conditions under which data collision occurs. In comparison with the CBC mode of data encryption, the above-noted condition under which data collision occurs is very strict. The number of the formulas representing the condition is (v+r), and it should be noted that the condition is expressed by not only the parameter v which controls the number of encryption algorithms but also the parameter r which is dependent on the history length of the encryption algorithm related to the concealment of encrypted data. In other words, the advantages of the above-noted condition is more than the advantages obtained by merely using a number of encryption algorithms.

As can be seen from the above detailed descriptions, the present invention is featured in two points. First, a plurality of encryption algorithms selectively used by the encryption processing circuits are not switched from one to another in response to a deterministic control signal; they are switched from one to another in a statistic method dependent on the result of the preceding encryption processing circuit. Second, the value obtained by the present-time encryption processing is concealed by use of a value or values dependent on the entirety or part of the past history of encryption algorithms before it is supplied to the next encryption processing circuit, to thereby leave no data suggestive of the control under which an encryption algorithm is changed.

Because of these features, it is practically impossible for a third party to know a series of encryption algorithms actually used in the hashing processing. In addition, since encrypted data is concealed by use of a value or values dependent on the entirety or part of the past history of the encryption algorithms, it is very difficult to prepare message data whose hash value coincides with that of the message data encrypted by the present invention.

In the embodiment mentioned above, the encryption processing circuit can be grouped into blocks such that each block is made by one encryption processing module. If, in this case, each encryption processing module is designed such that it executes both the determination of a new encryption algorithm to be used in the next module and the concealment of the data encrypted by the present-used encryption algorithm, the apparatus incorporating such modules can ensure very reliable data security.

Figure 5:
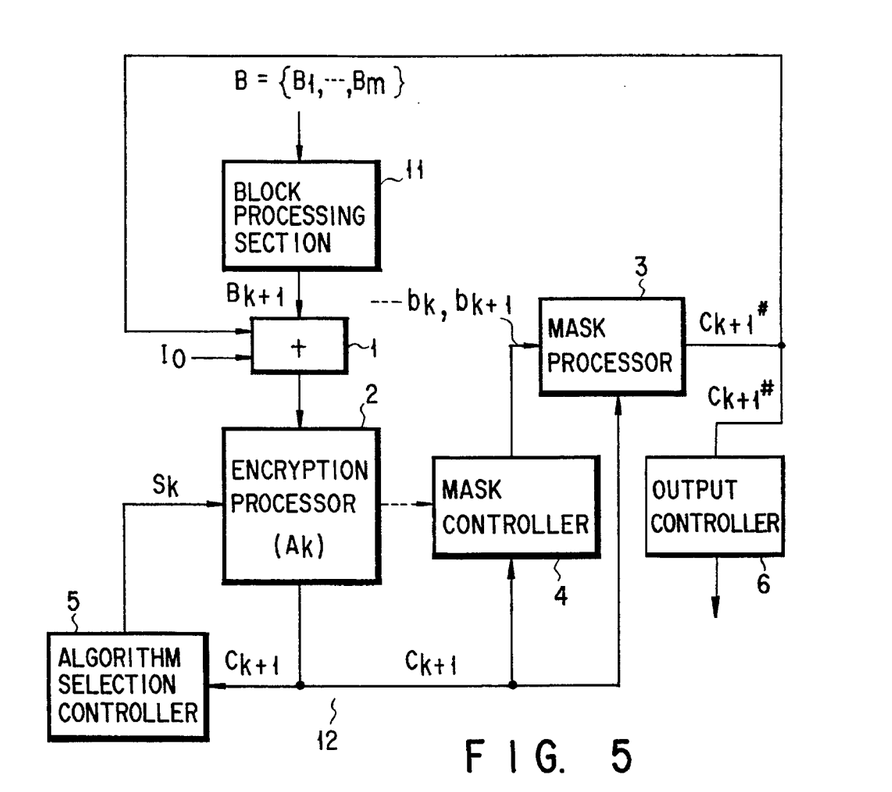
FIG. 5 is a block circuit diagram showing a data processing apparatus according to the second embodiment of the present invention, the data processing apparatus being obtained by simplifying that of the first embodiment.

Since the encryption processing circuits are the same in configuration, the adder 1, encryption processor 2, mask processor 3, mask controller 4, and algorithm selection controller 5 of one processing circuit may be fabricated as one module, and this module may be repeatedly used for data blocks $B_1$ to $B_m$, as shown in FIG. 5. If this is done, the entire apparatus can be considerably simplified.

In the case shown in FIG. 5, the block processing section 11 divides message data B into data blocks $B_1$ to $B_m$ and supplies the data blocks $B_1$ to $B_m$ to the adder 1 on the time divisional basis. The processing result $C_i\#$ of the mask processor 3 is fed back to the adder 1, and a selection signal S produced by the algorithm selection controller 5 is supplied to the encryption processor 2, so as to determine the encryption algorithm to be used subsequently.

Further, an output controller 6 is provided. When the mask processor 3 produces the processing output $C_m\#$ corresponding to the last data block $B_m$, the output controller 6 outputs the processing output $C_m\#$ as a compressed and encrypted processing result. With this data processing, the apparatus can be very simple in configuration and yet the same operation similar as that of the case shown in FIG. 1 can be realized.

Figure 6:
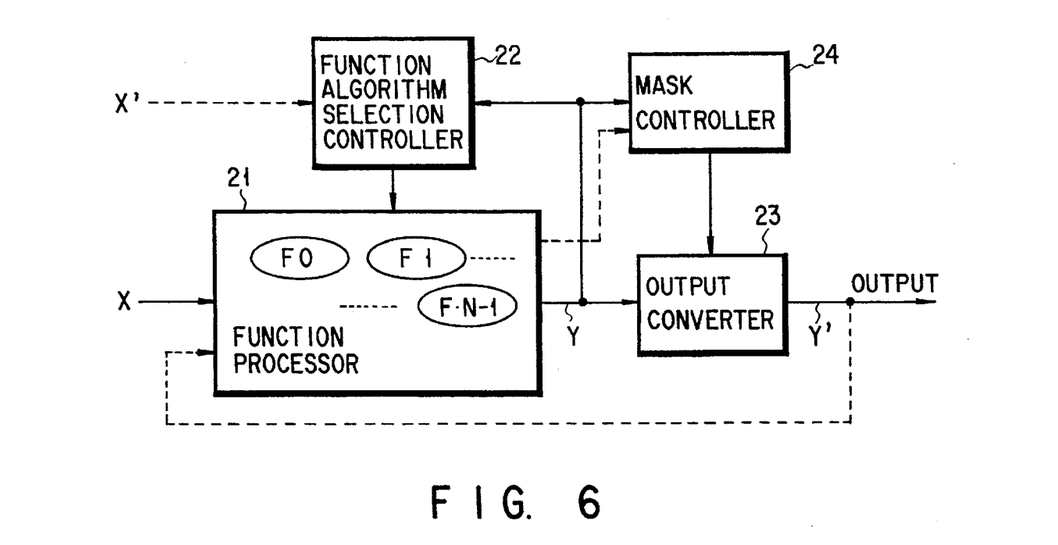
FIG. 6 is a block circuit diagram showing the configuration of a general-purpose data processing module according to the third embodiment, the data processing module being applicable not only to the data processing performed by the apparatuses shown in FIGS. 1 and 5 but also to data processing of other kinds.

The technique for processing data by selectively using a plurality of function algorithms is not limited to the encryption processing described above; it is applicable to various kinds of data conversion. FIG. 6 shows an example of a general-purpose data processing module which can be applied not only to the data processing apparatuses shown in FIGS. 1 and 5 but also to other types of data processors.

Referring to FIG. 6, a function processor 21 stores N function algorithms $F_0$ to $F_{N-1}$. The function algorithm executed by the function processor 21 is determined in response to a selection signal supplied from an algorithm selection controller 22. When function algorithm $F_k$ is selected, the function processor 21 carries out calculation $F_k(X)=Y$ with respect to input data X.

The function algorithm selection controller 22 receives the result of the calculation $F_k(X)=Y$ performed by the function processor 21. On the basis of the entirety or part of the received result, the function algorithm selection controller 22 determines function algorithm $F_{k+1}$ to be subsequently executed by the function processor 21, and supplies a selection signal S to the function processor 21.

As described above, the function algorithm can be changed from $F_k$ to $F_{k+1}$ in a variety of methods, and one of such methods is a statistic method wherein the temporal changes in the encryption algorithm are regarded as forming a finite-state discrete-time Markovjan process. Needless to say, the function algorithm may be changed deterministically on the basis of calculation result Y.

According to the above configuration, the function algorithm to be used next is determined on the basis of the result of calculation performed by the function processor 21, and this determination process is carried out within the module. Therefore, a third party cannot understand which algorithm is being executed at each stage of the processing.

As indicated by the dotted lines in FIG. 6, the function algorithm may be changed in response to externally-input data X'. In this case, the algorithm selection controller 22 compares the calculation result $F_k(X)$ of the function processor 21 with the externally-input data X', and determines the next function algorithm $F_{k+1}$ on the basis of the comparison. The function algorithm can be changed deterministically or statistically in this modification as well.

When putting the above modification into practice, the following control may be available. That is, when the comparison shows that $F_k(X)$ is equal to X', the present algorithm $F_k$ is maintained unchanged, and when the comparison shows that $F_k(X)$ differs from X', the present algorithm $F_k$ is changed to another algorithm $F_{k+1}$.

According to the above configuration, the function algorithm is not designated directly by the externally-input data X'. Therefore, a third party cannot know the processing performed inside the apparatus even when the function algorithm is externally selected or controlled.

In the embodiment shown in FIG. 6, the result of the calculation $F_k(X)=Y$ performed by the function processor 21 is not output as it is. In other words, it is masked in an output converter 23 by replacing it with other values, before it is output. Therefore, further reliable data security is ensured.

In the present invention, various data masking methods are available. In the case where the temporal changes in the algorithm form a finite-state discrete-time Markovjan process, a method which uses a value $B_j$ ($j \leq k$) dependent on the history of the algorithms executed so far is applicable. That is, value Y is changed by use of the value $B_j$ as follows: $Y' = Y + B_j$ ($j \leq k$).

In the embodiment shown in FIG. 6, a mask controller 24 identifies the history of the past algorithms on the basis of the calculation result Y of the function processor 21, and calculates a value $B_j$ dependent on the history. With this value j supplied to the output converter 23, the masking processing mentioned above is performed.

Needless to say, the output conversion need not be performed by the mask controller 24. It may be carried out on the basis of fixed data stored in the output converter 23. In addition, if the function processor 21 is made to store data on the history of the function algorithm, the mask controller 24 may receive the history data directly from the function processor 21, as indicated by the dotted lines in FIG. 6.

The above embodiment was described, referring to the case where the function algorithms stored in the function processor 21 are independent of one another. However, this in no way limits the present invention. For example, one function algorithm may be a combination of one fundamental algorithm portion F and a plurality of sub algorithm portions $G_0$ to $G_{N-1}$, and the entire algorithm may be changed by controlling only the sub algorithm portions $G_0$ to $G_{N-1}$. If this is performed, the function processor 21 need not have a large storage capacity to store the function algorithm, so that a reduction in the circuit scale can be attained easily, as in the case where the module is fabricated as a large scale integrated circuit.

In the above embodiment, the function processor 21 has only one input terminal. However, the present invention is not limited to this. As is indicated by the broken line in FIG. 6, an output of the output converter 23 may be fed back to the function processor 21.

The entire module need not be fabricated as a large scale integrated circuit. In other words, the function processor 21 may be divided into an algorithm storage section and an arithmetic processing section. In this case, an algorithm is read out from the algorithm storage section in response to a selection control signal supplied from the algorithm selection controller 22, and the readout algorithm is supplied to the arithmetic processing section. If the algorithm storage section designed such that the algorithms therein can be varied or a new algorithm can be to added thereto, then data security can be made further reliable, and the range of application of the embodiment can be widened.

Where the data processing module mentioned above is applied to the data processing apparatus shown in FIG. 5, the function processor 21 can be used as encryption processor 2; the algorithm selection controller 22, as algorithm selection controller 5; the output converter 23, as mask processor 3; and the mask controller 24, as mask controller 4. The data processing module is also applicable to the data processing apparatus shown in FIG. 1 in a similar manner.

The present invention is not limited to the embodiments described above. For example, the function algorithms are not limited to encryption algorithms mentioned above; they may be algorithms which are used for other kinds of data conversion. When the present invention is reduced to practice, it can be modified in various manners without departing from the spirit of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data processing apparatus comprising:
   a block processing section for dividing message data into a plurality of blocks, so as to obtain a plurality of data blocks; and
   a plurality of data conversion processing sections which are provided in correspondence to the data blocks and each of which stores a plurality of data conversion algorithms therein, a first one of said data conversion processing sections selecting one of the data conversion algorithms in response to an initial selection control signal and each of remaining ones of said data conversion processing sections selection one of the data conversion algorithms in response to a selection control signal supplied from a preceding data conversion processing section, each of said data conversion processing sections performing data conversion processing with respect to the corresponding data block on the basis of the selected data conversion algorithm and generating a selection control signal used for processing a next data block on the basis of the data conversion processing, wherein each of said data conversion processing sections includes an input processor, an algorithm operation processor, and an algorithm selection controller;
   processing data is transferred from each of said data conversion processing sections to an immediately succeeding data conversion processing section;
   each input processor adds processing data of a preceding data conversion processing section to its corresponding data block;
   each algorithm operation processor has a plurality of function algorithms previously stored therein, and operates on the function algorithms in response to the selection control signal to thereby generate each of said data conversion algorithms, and performs data conversion processing with respect to the data obtained by the input processor on the basis of the data conversion algorithms;
   each algorithm selection controller generates one of said selection control signals on the basis of a processing result of the algorithm operation processor, said selection control signal controlling selection of a data conversion algorithm to be executed by an algorithm operation processor of a succeeding data conversion processing section; and
   each algorithm selection controller controls the selection of the data conversion algorithm to be executed by the algorithm operation processor of the succeeding data conversion processing section, such that temporal changes in said data conversion algorithm form a finite-state discrete-time Markovian process.

2. A data processing apparatus according to depend on claim 1, wherein:
   each of said data conversion processing sections further includes a mask processor; and
   each mask processor masks at least part of the processing result of the algorithm operation processor and outputs masked processing data as processing data of the corresponding data conversion processing section.

3. A data processing apparatus according to claim 2, wherein:
   each of said data conversion processing sections further includes a mask controller; and each mask controller updates previous information regarding the data conversion algorithm executed by the algorithm operation processor, stores updated previous information, and controls masking processing performed by the mask processor.

4. A data processing apparatus according to claim 3, wherein:

each algorithm selection controller controls the selection of the data conversion algorithm to be executed by the algorithm operation processor of the succeeding data conversion processing section, on the basis of a trellis diagram of convolutional codes having a predetermined encoding rate; and each mask controller updates history information on branch codes of the data conversion algorithm depicted on the trellis diagram, stores updated history information, and controls the masking processing performed by the mask processor on the basis of at least part of values of the history information.

5. A data processing apparatus according to claim 1, wherein said data conversion algorithms stored in the data conversion processing sections are used for data encryption.

6. A data processing apparatus according to claim 1, wherein at least said data conversion processing sections are fabricated as modules, such that processing performed in the data conversion processing sections cannot be known externally.

7. A data processing apparatus comprising:

a block processing section for dividing message data into a plurality of data blocks and outputting the data blocks on a time-divisional basis; and a data conversion processing section for selecting one of a plurality of data conversion algorithms stored therein beforehand in response to an initial selection control signal, for sequentially performing data conversion processing with respect to the data blocks supplied from the block processing section, on the basis of a selected data conversion algorithm, and for generating a selection control signal, with which to select an algorithm for performing data conversion with respect to a next data block, on the basis of the data conversion processing, wherein said data conversion processing section includes an input processor, an algorithm operation processor, and an algorithm selection controller;

said input processor adds latest data conversion processing data to a present data block;

said algorithm operation processor has a plurality of function algorithms previously stored therein, and operates on the function algorithms in response to the selection control signal to thereby generate a data conversion algorithm, and performs data conversion processing with respect to the data obtained by the input processor on the basis of the data conversion algorithm;

said algorithm selection controller generates a selection control signal on the basis of a processing result of the algorithm operation processor, said selection control signal controlling selection of a data conversion algorithm to be subsequently executed by the algorithm operation processor; and said algorithm selection controller controls the selection of a data conversion algorithm to be subsequently executed by the algorithm operation processor, such that temporal changes in the data conversion algorithm form a finite-state discrete-time Markovian process.

8. A data processing apparatus according to claim 7, wherein:

said data conversion processing section further includes a mask processor; and said mask processor masks at least part of the processing result of the algorithm operation processor and outputs masked processing data as processing data of the data conversion processing section.

9. A data processing apparatus according to claim 8, wherein:

said data conversion processing section further includes a mask controller; and said mask controller updates previous information regarding the data conversion algorithm executed by the algorithm operation processor, stores updated previous information, and controls masking processing performed by the mask processor.

10. A data processing apparatus according to claim 9, wherein:

said algorithm selection controller controls the selection of the data conversion algorithm to be subsequently executed by the algorithm operation processor, on the basis of a trellis diagram of convolutional codes having a predetermined encoding rate; and said mask controller updates history information on branch codes of the data conversion algorithm depicted on the trellis diagram, stores updated history information, and controls the masking processing performed by the mask processor on the basis of at least part of values of the history information.

11. A data processing apparatus according to claim 7, wherein said data conversion algorithms stored in the data conversion processing section are used for data encryption.

12. A data processing apparatus according to claim 7, wherein at least said data conversion processing section is fabricated as a module such that processing performed in the data conversion processing section cannot be known externally.

* * * * *